(12) United States Patent
Kong et al.

(10) Patent No.: US 12,165,023 B2
(45) Date of Patent: Dec. 10, 2024

(54) MEASURING LOCAL CD UNIFORMITY USING SCATTEROMETRY AND MACHINE LEARNING

(71) Applicants: NOVA LTD., Rehovot (IL); INTERNATIONAL BUSINESS MACHINES CORPORATION, Armonk, NY (US)

(72) Inventors: Dexin Kong, Slingerlands, NY (US); Daniel Schmidt, Armonk, NY (US); Aron J. Cepler, Armonk, NY (US); Marjorie Cheng, Armonk, NY (US); Roy Koret, Rehovot (IL); Igor Turovets, Rehovot (IL)

(73) Assignees: NOVA LTD., Rehovot (IL); INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/904,872

(22) PCT Filed: Feb. 23, 2021

(86) PCT No.: PCT/IB2021/051501
§ 371 (c)(1),
(2) Date: Aug. 23, 2022

(87) PCT Pub. No.: WO2021/165941
PCT Pub. Date: Aug. 26, 2021

(65) Prior Publication Data
US 2023/0131932 A1  Apr. 27, 2023

(51) Int. Cl.
*G06N 20/00* (2019.01)
*G01J 3/28* (2006.01)

(52) U.S. Cl.
CPC ............... *G06N 20/00* (2019.01); *G01J 3/28* (2013.01)

(58) Field of Classification Search
CPC ................... G06N 20/00; G01J 3/28
See application file for complete search history.

(56) References Cited

U.S. PATENT DOCUMENTS

2010/0284005 A1* 11/2010 Malinen .................... G01J 3/02
356/326
2012/0226644 A1   9/2012 Jin et al.
(Continued)

OTHER PUBLICATIONS

Rana, Narender, Yunlin Zhang, Taher Kagalwala, and Todd Bailey. "Leveraging advanced data analytics, machine learning, and metrology models to enable critical dimension metrology solutions for advanced integrated circuit . . . " Journal of Micro/Nanolithography, MEMS, and MOEMS 13, No. 4 (2014): Apr. 14, 2015 (Year: 2014).*

(Continued)

*Primary Examiner* — Casey R. Garner
(74) *Attorney, Agent, or Firm* — Reches Patents

(57) ABSTRACT

A method, a system, and a non-transitory computer readable medium for measuring a local critical dimension uniformity of an array of two-dimensional structural elements, the method may include obtaining an acquired optical spectrometry spectrum of the array; feeding the acquired optical spectrometry spectrum of the array to a trained machine learning process, wherein the trained machine learning process is trained to map an optical spectrometry spectrum to an average critical dimension (CD) and a local critical dimension uniformity (LCDU); and outputting, by the trained machine learning process, the average CD and the LCDU of the array.

17 Claims, 5 Drawing Sheets

(56) References Cited

U.S. PATENT DOCUMENTS

| | | |
|---|---|---|
| 2019/0025706 A1 | 1/2019 | Coenen et al. |
| 2019/0137891 A1* | 5/2019 | Brink .................... H10N 50/01 |
| 2019/0259145 A1 | 8/2019 | Kong et al. |
| 2019/0287238 A1 | 9/2019 | Sriraman |
| 2021/0035833 A1* | 2/2021 | Feng ...................... G01B 15/04 |
| 2021/0397172 A1* | 12/2021 | Slachter ............. G05B 19/4188 |

OTHER PUBLICATIONS

Utzny, Clemens. "CD process control through machine learning." In 32nd European Mask and Lithography Conference, vol. 10032, pp. 205-213. SPIE, 2016. (Year: 2016).*

Rademaker, Guido, Yoann Blancquaert, Thibault Labbaye, Lucie Mourier, Nivea Figueiro, Francisco Sanchez, Roy Koret et al. "Feasibility of monitoring a multiple e-beam tool using scatterometry and machine learning: . . . " In 34th European Mask and Lithography Conference, vol. 10775, pp. 22-28. SPIE, 2018.*

Rana, Narender, Yunlin Zhang, Donald Wall, and Bachir Dirahoui. "Predictive data analytics and machine learning enabling metrology and process control for advanced node IC fabrication." In 2015 26th Annual SEMI Advanced Semiconductor Manufacturing Conference (ASMC), pp. 313-319. IEEE, 2015. (Year: 2015).*

Chaudhary, Narendra, Serap A. Savari, and Sai S. Yeddulapalli. "Line roughness estimation and Poisson denoising in scanning electron microscope images using deep learning." Journal of Micro/Nanolithography, MEMS, and MOEMS 18, No. 2 (2019): 024001-024001. (Year: 2019).*

Kong et al., "Measuring local CD uniformity in EUV vias with scatterometry and machine learning." Proceedings vol. 11325, Metrology, Inspection, and Process Control forMicrolithography XXXIV, available online May 4, 2020 (May 4, 2020) abstract[Online].

* cited by examiner

MEASURING LOCAL CD UNIFORMITY USING SCATTEROMETRY AND MACHINE LEARNING

CROSS REFERENCE

This application claims priority from US provisional patent filing date Feb. 23, 2020, Ser. No. 62/980,335 which is incorporated herein by reference.

BACKGROUND

Semiconductor devices are manufactured by a highly complex manufacturing process that includes a lithography phase during which a photoresist layer is exposed to Extreme Ultra Violet (EUV) radiation thereby forming patterns in the photoresist. The patterned photoresist may be used as an etch mask for forming structural elements of nanometric scale.

A two-dimensional array of structural elements (such as vias) should include structural elements that are identical to each other. Nevertheless—the lithography phase (and any other manufacturing phase—such as etch) is not ideal and the structural elements may deviate from each other.

Local critical dimension uniformity (LCDU) represents critical dimension (CD) variations between different structural elements and is three times the standard deviation of the structural element average CD.

The LCDU may dramatically impact the yield of the manufacturing process and should be monitored closely.

LCDU can be measured using a CD Scanning Electron Microscope (CD-SEM) to measure individually the CDs of some structural elements and then estimate the LCDU. This process is very lengthy and in practice is limited to measuring only a few structural elements at high magnification—which may reduce the accuracy of the LCDU measurement, and may also damage the measured sample.

There is a growing need to provide a safe and accurate method for measuring the LCDU of an array of two-dimensional structural elements.

SUMMARY

There may be provided a system, a method, and a non-transitory computer readable medium that stores instructions for measuring a LCDU of an array of two-dimensional (2D) structural elements.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Figure 1:
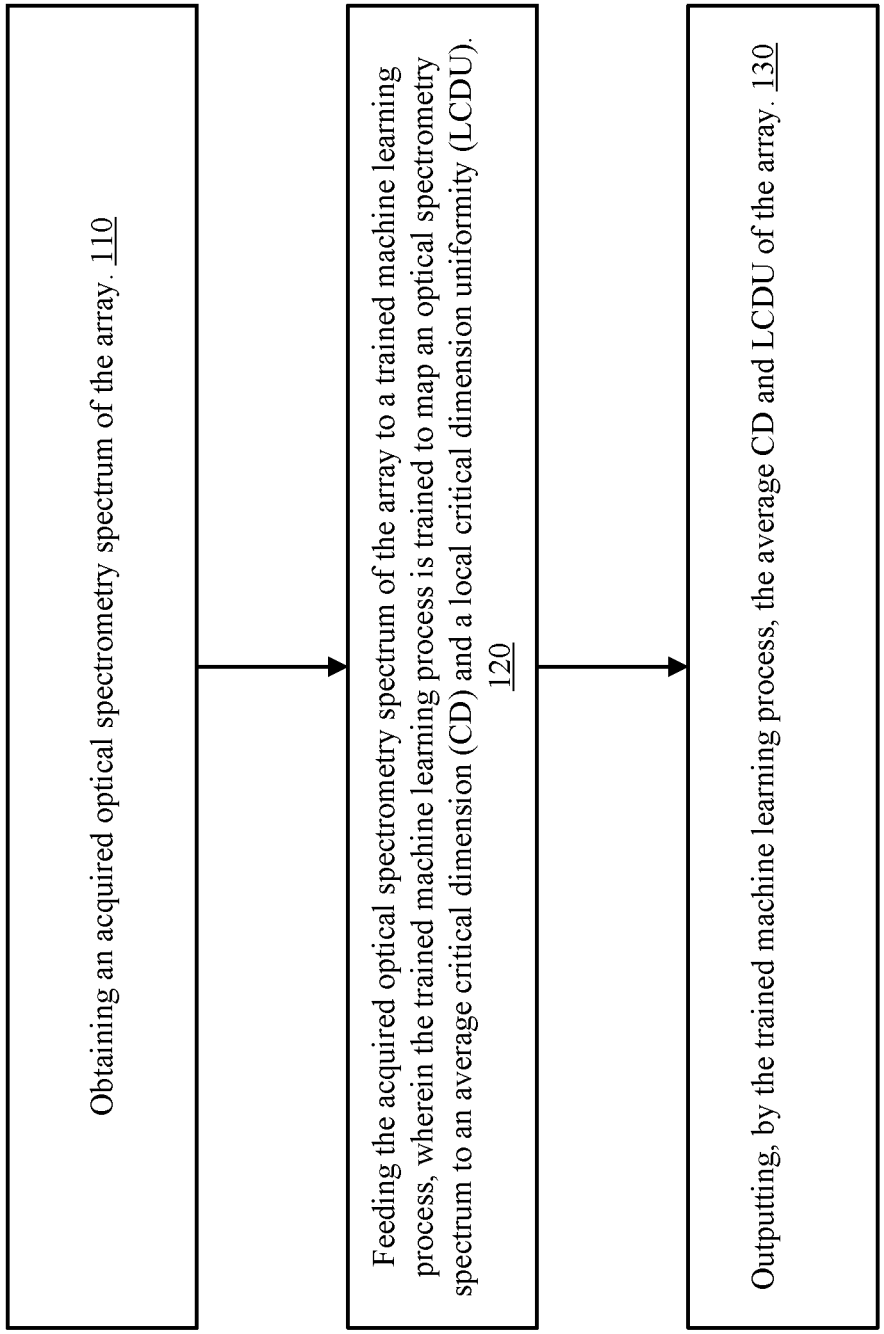
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to either one of a system, a method and a non-transitory computer readable medium should be applied mutatis mutandis to any other of the system, a method and a non-transitory computer readable medium. For example—any reference to a system should be applied mutatis mutandis to a method that can be executed by the system and to a non-transitory computer readable medium that may stores instructions executable by the system.

Because the illustrated at least one embodiment of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any number, or value illustrated below should be regarded as a non-limiting example.

The phrase "A based on B" may mean that A is solely based on B or that A is based on B and one or more other elements and/or parameters and/or information. Based on means that a calculation of A is affected by B and/or that the value of A is a function of the value of B.

The term "obtaining" may include generating, receiving, and the like. For example—receiving an optical spectrometry spectrum of an array of two-dimensional (2D) structural elements, or generating the optical spectrometry spectrum of an array (for example by illuminating the array with broadband radiation, collecting signals emitted from the array as a result of the illuminating and processing the signals).

The specification and/or drawings may refer to a processor. The processor can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Some of the examples mentioned in the specification and drawings refer to vias. Vias are a non-limiting example of 2D structural elements. Lines may be regarded as one dimensional structural elements.

There may be provided a fast and accurate method for measuring an LCDU of an array of two-dimensional structural elements.

The method may be used for automatic process control (APC) during high volume manufacturing (HVM), for manufacturing processes that may include EUV lithography and/or ETCH processes.

The method may include using a machine learning process that was trained to map an optical spectrometry spectrum of array of the 2D structural elements to average CD and LCDU values of the array.

The training process may include obtaining average CD and LCDU values of different arrays that are measured by a CD-SEM. The different arrays may differ from each other by their manufacturing process conditions (for example—difference in the illumination conditions such as dose, focus, a direction of illumination, and/or any other manufacturing process conditions)—in order to provide a mapping that is valid for arrays that are manufactured under a variety of manufacturing process conditions.

For each array—the measurements should include measuring a CD of a significant number (for example at least 100, 150, 200, 300, 400 and the like) of 2D structural elements of an array. The significant number exceeds the number required for only determining the average CD—because the measurement is required to capture CD values that span along the entire three times the standard deviation of the structural element average CD.

The measurement of CDs of a significant number of 2D structural elements bridges the gap between number (usually only a few) of 2D structural elements measured by a CD-SEM (over a reasonable period of time) and the vast number (even hundreds, thousands, tens of thousands, and more) of 2D structural elements having their CD measured by optical spectrometry.

The CD values of the structural elements may be filtered (for example by performing outlier removal) before calculating the CD average and the LCDU.

Outliers may be irregular contours (for example—assuming that the contour of a via is a circle—then contours that substantially deviate from a circle may be regarded as having irregular contours), and vias that are merged in the CD-SEM image.

The removal of outliers significantly improve the accuracy of the method—as the LCDU is highly sensitive to outliers. In statistics, an outlier is a data point that differs significantly from other observations. What amounts to an outlier and/or what results in difference significance may be determined and/or defined in any manner.

The machine learning process is trained to build a model based on the average CD and LCDU values of different arrays that are measured by a CD-SEM, and (b) the optical spectrometry spectra of the different arrays.

The training process may be a supervised training process in which the optical spectrometry spectra of the different arrays are fed as inputs to the machine learning process—while the average CD and LCDU values are provided as a desired output of the machine learning process.

The training process may be executed off-line and/or ON design-of-experiment (DOE) wafers.

The optical spectrometry spectrum may be obtained HVM whether on stand-alone (SA) or IM (Integrated Metrology systems).

After the machine learning process is trained (to provide a trained machine learning process), the average CD and LCDU of a measured array of 2D structural elements may be determined by (a) obtaining an acquired optical spectrometry spectrum of the measured array of 2D structural elements, (b) feeding the optical spectrometry spectrum of the measured array of 2D structural elements to the trained machine learning process, and (c) receiving from the trained machine learning process, the average CD and LCDU of the measured array of 2D structural elements.

The suggested method is expected to be more accurate and faster than known model-based optical spectrometry methods that require to calculate a highly accurate model of the measured array of 2D structural elements—as such a model is very hard to calculate and is also very sensitive to the location (which is unknown) of 2D structural elements of different CD values within the array. For example—assuming that the array includes N rows and M columns of vias—and that the vias have K different CD values—then the location of the vias of these K different CD values may affect the output of the model-based optical spectrometry.

The following method may be executed by a computer or by a spectrometer, by a system that may include a spectrometer, by a system having illumination and collection paths, and the like.

FIG. 1 illustrates an example of method 100 for measuring a LCDU of an array of 2D structural elements.

Method 100 may start by step 110 of obtaining an optical spectrometry spectrum of the array.

Step 110 may be followed by step 120 of feeding the acquired optical spectrometry spectrum of the array to a trained machine learning process, wherein the trained machine learning process is trained to map optical spectrometry spectra to average critical dimension (CD) and local critical dimension uniformity (LCDU) values.

Step 120 may be followed by step 130 of outputting, by the trained machine learning process, the average CD and LCDU of the array.

Figure 2:
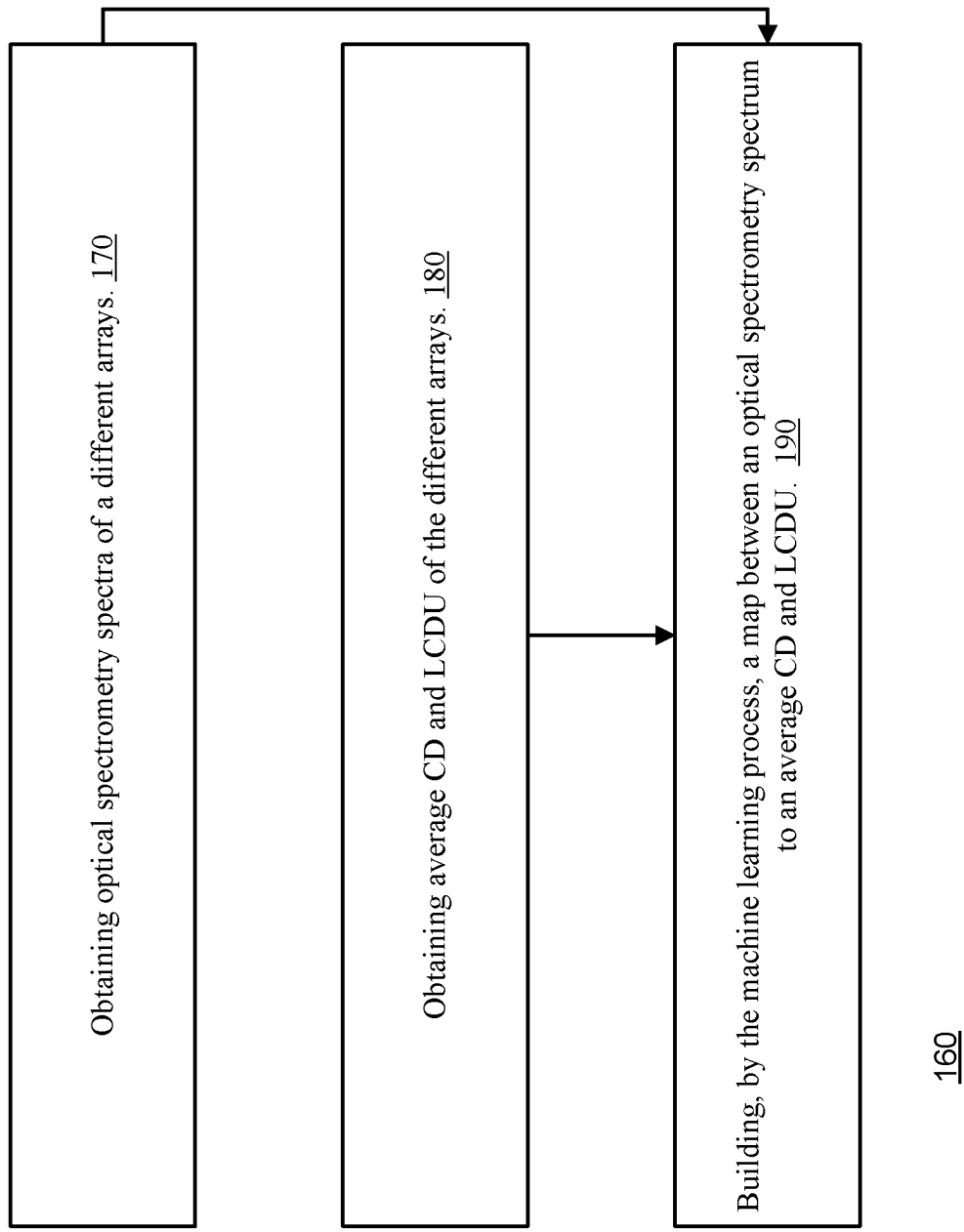
FIG. 2 illustrates an example of a method.

FIG. 2 illustrates method 160 of training a machine learning process.

Method 160 may start by steps 170 and 180.

Step 170 may include obtaining optical spectrometry spectra of different arrays.

Step 180 may include obtaining average CD and LCDU values of the different arrays, the average CD and LCDU values are measured by a CD scanning electron microscope (CD-SEM).

An average CD and LCDU values of an array of the different arrays may be calculated by after removing outlier CD values of the array.

Steps 170 and 180 may be followed by step 190 of building, by the machine learning process, a map (or a model that maps) between the optical spectrometry spectra to average CD and LCDU values.

Step 190 may include multiple iterations, each iteration may include:

a. Selecting an array of the multiple arrays.
b. Feeding the machine learning process with the optical spectrometry spectrum of the array.
c. Generating a machine learning process output related to the array.
d. Comparing (or applying a cost or error function on) the machine learning process output related to the array to average CD and LCDU values of the array. The average CD and LCDU values are measured by a CD scanning electron microscope (CD-SEM).

e. Configuring the machine learning process according to the outcome of step (c) and jumping to step (a) for selecting a new array.

The optical spectrometry spectra of an array may be fed as input of the machine learning process and the average CD and LCDU values may be provided as a desired output of the machine learning process.

The LCDU accuracy may require to obtain the average CD and LCDU of arrays with a significant number of 2D structural elements.

Figure 3:
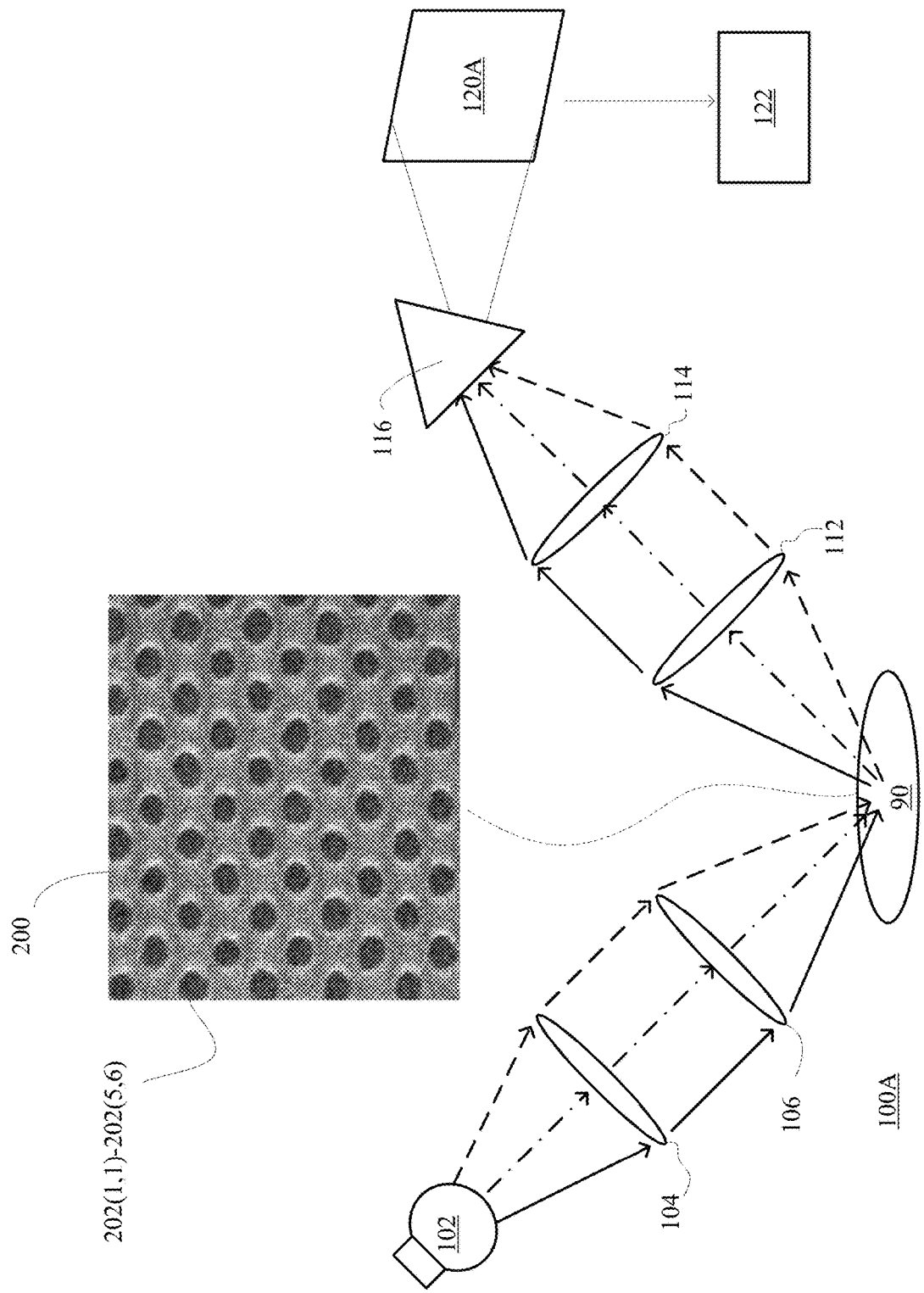
FIG. 3 illustrates an example of a system and a part of an array of vias.

FIG. 3 illustrates a system 100A, a sample 90, and about thirty vias of a part 200 of an array of vias.

The system 100A may be a spectrometer and includes an illumination path for illuminating the sample 90 with broad band illumination (that may include radiation of different frequencies or different "colors")—as can be seen from the different types of arrows that are emitted from broadband source 102, pass through illumination optics (such as lenses 104 and 106), and impinge of an array of vias (see a part 200 of the array—the part includes vias 202(1,1)-202(5,6)).

Broadband radiation is reflected and/or returned and/or scattered from the array via collection optics (such as lenses 112 and 114), onto color separator 116 that separates the different colors so that radiation of different colors impinges on different pixels of detector 120A.

Non-limiting example of spectrometers may be, for example, spectrometers manufactured by Nova Measuring Instruments Ltd. and may be (or may be included in), for example Integrated metrology Systems such as—ASTERA, NOVA i570, NOVA i550, NOVA i500, etc. and/or stand alone systems: NOVA T500, NOVA T550, NOVA T600, etc. An example of a spectrometer is illustrated in U.S. Pat. No. 6,657,736 which is incorporated herein by reference.

The detection signals form an optical spectrometry spectrum (or are processed to provide the optical spectrometry spectrum) which is fed to a processor 122 that may implement the machine learning process to provide the average CD and LCDU of the array.

Figure 4:
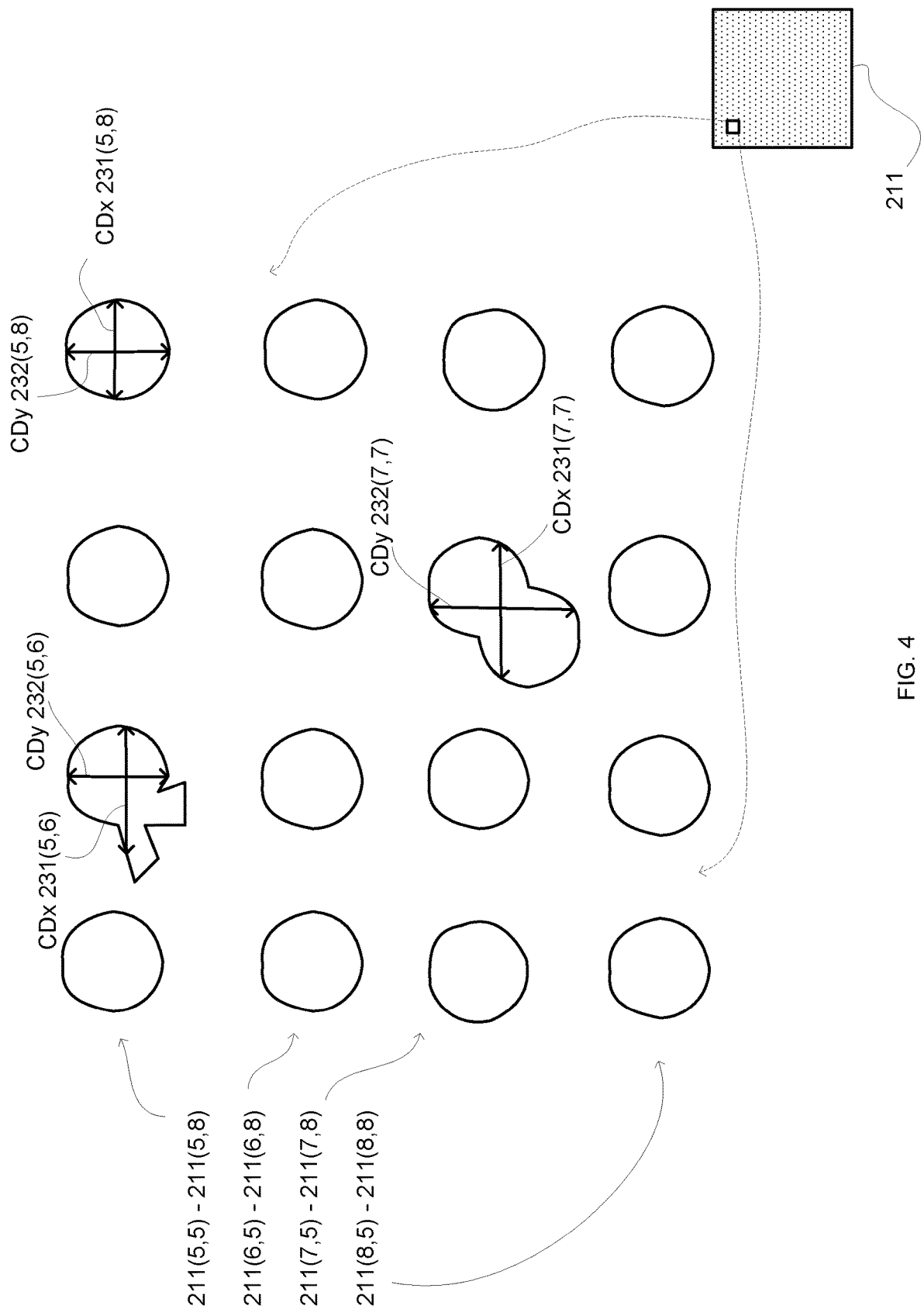
FIG. 4 illustrates an example of an array of vias and also illustrates sixteen vias.

FIG. 4 illustrates an example of an array 211 of vias—out of which sixteen vias (four by four vias) are shown and denoted 211(5,5)-211(5,8), 211(6,5)-211(6,8), 211(7,5)-211(7,8), and 211(8,5)-211(8,8).

Vias 211(5,6) and 211(7,7) are outliers—and if the array 211 is used for training the machine learning process—their CDs are ignored of when calculating the average CD and the LCDU of the array 211.

In FIG. 4, a CD of a via is an average between the x-axis CD of the via (for example CDx 231(5,6), CDx 231(5,8) and CDx 231(7,7)) and the y-axis CD of the via (for example CDy 232(5,6), CDy 232(5,8) and CDy 232(7,7)).

Figure 5:
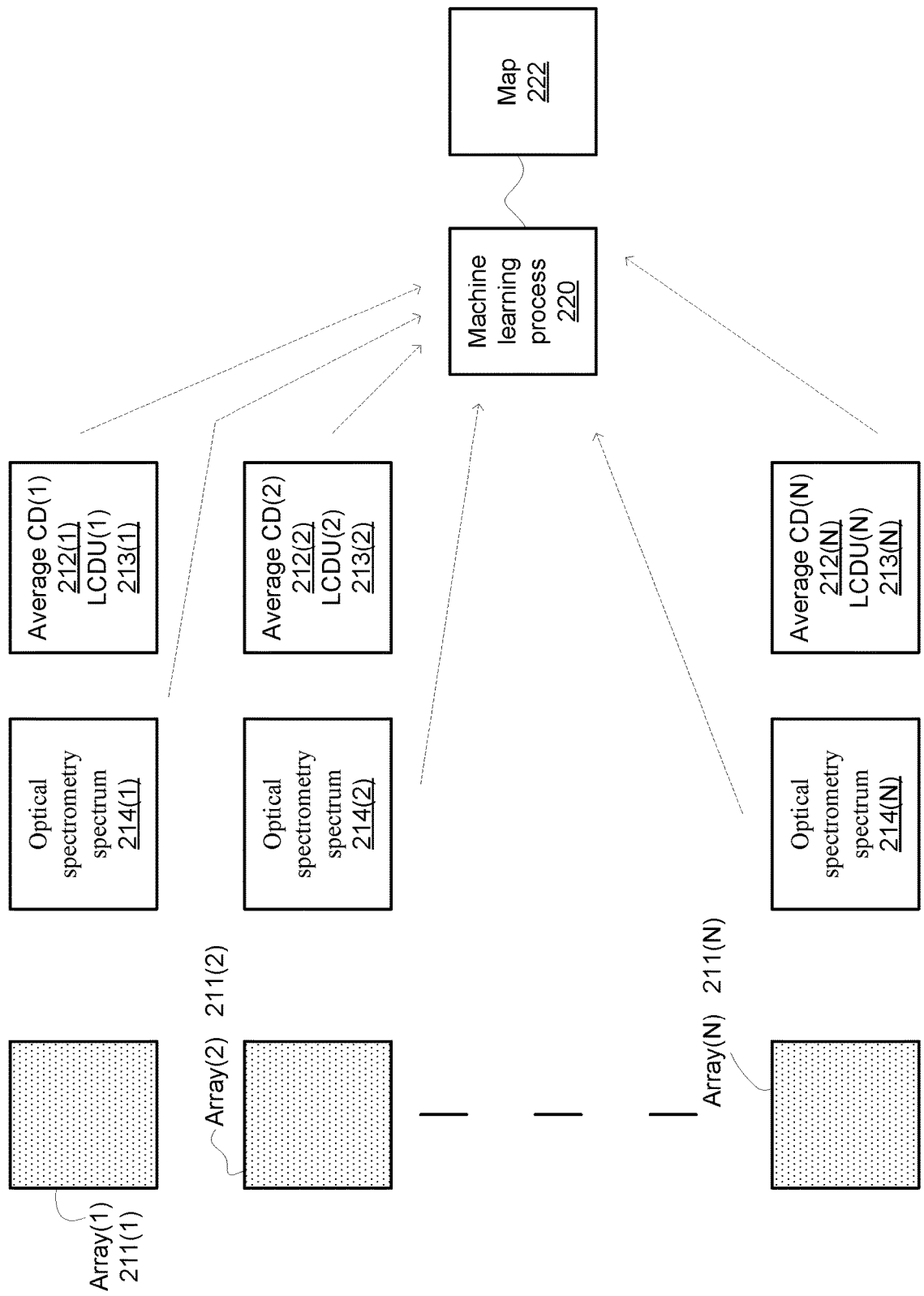
FIG. 5 illustrate different arrays, optical spectrometry spectra, various average CD measurements and LCDU measurements, a processor implementing a machine learning process and a map generated by the machine learning process.

FIG. 5 illustrates a training process during which the machine learning process 220 builds a map 222 based on N optical spectra 214(1)-214(N) of N arrays 211(1)-211(N), and based on N average CD 212(1)-212(N), and N LCDU 213(1)-213(N) of the N arrays 211(1)-211(N).

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation; a single operation may be distributed in additional operations and operations may be executed at least partially overlapping in time. Moreover, alternative embodiments may include multiple instances of an operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The terms "including", "comprising", "having", "consisting" and "consisting essentially of" can be replaced with each other. For example—any method may include at least the steps included in the figures and/or in the specification, only the steps included in the figures and/or the specification.

We claim:

1. A method for measuring a local critical dimension uniformity of an array of two-dimensional structural elements, the method comprises:
   illuminating, by a spectrometer, the array with broadband radiation that comprises different frequencies; wherein the two-dimensional structural elements are vias;
   receiving, by the spectrometer, radiation emitted from the array as a result of the illuminating of the array;
   separating the radiation emitted from the array by a frequency separator so that emitted radiation of the different frequencies impinges on different pixels of a detector of the spectrometer;

generating, by the detector, detection signals;

generating, by a spectrometer and based on the detection signals, an acquired optical spectrometry spectrum of the array;

feeding the acquired optical spectrometry spectrum of the array to a trained machine learning process, wherein the trained machine learning process is trained to map an optical spectrometry spectrum to an average critical dimension (CD) and a local critical dimension uniformity (LCDU); wherein the trained machine learning process was trained by feeding the machine learning process with (a) optical spectrometry spectra of different arrays, and (b) an average CD and LCDU of the different arrays, the average CD and LCDU are measured by a CD scanning electron microscope (CD-SEM); wherein each of the different arrays comprises at least a defined number of vias, the defined number exceeds one hundred and is determined based on three times a standard deviation of an average critical dimension of the vias of an array of the different arrays; and outputting, by the trained machine learning process, the average CD and the LCDU of the array.

2. The method according to claim 1 wherein an average CD and LCDU of an array of the different arrays are calculated after removing outlier CD values of the array.

3. The method according to claim 1 wherein the optical spectrometry spectra are inputs to the machine learning process, and the average CD and LCDU of the different arrays are required outputs of the machine learning process.

4. The method according to claim 1 wherein the defined number exceeds 151.

5. The method according to claim 1 wherein the defined number exceeds 399.

6. The method according to claim 1 comprising training the machine learning process to map the optical spectrometry spectra to average CD and uniformity (LCDU) values.

7. A non-transitory computer readable medium for measuring a local critical dimension uniformity of an array of two-dimensional structural elements, the non-transitory computer readable medium that stores instructions for:

illuminating, by a spectrometer, the array with broadband radiation that comprises different frequencies; wherein the two-dimensional structural elements are vias;

receiving, by the spectrometer, radiation emitted from the array as a result of the illuminating of the array;

separating the radiation emitted from the array by a frequency separator so that emitted radiation of the different frequencies impinges on different pixels of a detector of the spectrometer;

generating, by the detector, detection signals;

generating, by a spectrometer and based on the detection signals, an acquired optical spectrometry spectrum of the array;

feeding the acquired optical spectrometry spectrum of the array to a trained machine learning process, wherein the trained machine learning process is trained to map optical spectrometry spectra to average critical dimension (CD) and local critical dimension uniformity (LCDU) values; wherein the trained machine learning process was trained by feeding the machine learning process with (a) optical spectrometry spectra of different arrays, and (b) an average CD and LCDU of the different arrays, the average CD and LCDU are measured by a CD scanning electron microscope (CD-SEM); wherein each of the different arrays comprises at least a defined number of vias, the defined number exceeds one hundred and is determined based on three times a standard deviation of an average critical dimension of the vias of an array of the different arrays; and outputting, by the trained machine learning process, the average CD and LCDU of the array.

8. The non-transitory computer readable medium according to claim 7 wherein an average CD and LCDU of an array of the different array are calculated after removing outlier CD values of the array.

9. The non-transitory computer readable medium according to claim 7 wherein the optical spectrometry spectra are inputs to the machine learning process, and the average CD and LCDU of the different arrays are required outputs of the machine learning process.

10. The non-transitory computer readable medium according to claim 7 wherein the defined number exceeds 151.

11. The non-transitory computer readable medium according to claim 7 wherein the defined number exceeds 399.

12. The non-transitory computer readable medium according to claim 7 that stores instructions for training the machine learning process to map the optical spectrometry spectra to average CD and uniformity (LCDU) values.

13. A spectrometer for measuring a local critical dimension uniformity of an array of two-dimensional structural elements, the spectrometer comprises:

a detector;

an illumination path configured to illuminate the array with radiation that comprises different frequencies; wherein the two-dimensional structural elements are vias;

a collection path configured to:

receive radiation emitted from the array as a result of the illuminating of the array;

separate the radiation emitted from the array by a frequency separator so that emitted radiation of the different frequencies impinges on different pixels of the detector;

wherein the detector is configured to generate detection signals;

a processor that is configured to:

generate based on the detection signals, an acquired optical spectrometry spectrum of the array;

feed the acquired optical spectrometry spectrum of the array to a trained machine learning process, wherein the trained machine learning process is trained to map an optical spectrometry spectrum to an average critical dimension (CD) and a local critical dimension uniformity (LCDU); wherein the trained machine learning process was trained by feeding the machine learning process with (a) optical spectrometry spectra of different arrays, and (b) an average CD and LCDU of the different arrays, the average CD and LCDU are measured by a CD scanning electron microscope (CD-SEM); wherein each of the different arrays comprises at least a defined number of vias, the defined number exceeds one hundred and is determined based on three times a standard deviation of an average critical dimension of the vias of an array of the different arrays; and output, by the trained machine learning process, the average CD and the LCDU of the array.

14. The spectrometer according to claim 13 wherein an average CD and LCDU of an array of the different arrays are calculated after removing outlier CD values of the array.

15. The spectrometer according to claim 13 wherein the optical spectrometry spectra are inputs to the machine learning process, and the average CD and LCDU of the different arrays are required outputs of the machine learning process.

16. The spectrometer according to claim 13 wherein the defined number exceeds 151.

17. The spectrometer according to claim 13 wherein the defined number exceeds 399.

* * * * *